(12) United States Patent
Jin (10) Patent No.: US 11,102,671 B2
(45) Date of Patent: Aug. 24, 2021

(54) SERVICE DATA FLOW SENDING METHOD AND APPARATUS

(71) Applicant: Huawei Technologies Co., Ltd., Shenzhen (CN)

(72) Inventor: Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/188,659

(22) Filed: Nov. 13, 2018

(65) Prior Publication Data

US 2019/0082347 A1 Mar. 14, 2019

Related U.S. Application Data

(63) Continuation of application No. PCT/CN2016/081994, filed on May 13, 2016.

(51) Int. Cl.
*H04W 76/11* (2018.01)
*H04L 12/721* (2013.01)
(Continued)

(52) U.S. Cl.
CPC ......... *H04W 28/0231* (2013.01); *H04L 45/38* (2013.01); *H04W 28/10* (2013.01);
(Continued)

(58) Field of Classification Search
CPC ............. H04W 28/0231; H04W 76/15; H04W 36/0022; H04W 28/10; H04W 76/11;
(Continued)

(56) References Cited

U.S. PATENT DOCUMENTS 8,060,612 B1 11/2011 Mangal et al.
2009/0227228 A1 9/2009 Hu et al.
(Continued)

FOREIGN PATENT DOCUMENTS

CN 101399843 A 4/2009
CN 102209357 A 10/2011
(Continued)

OTHER PUBLICATIONS

3GPP TS 24.312v 13.2.0, Access network discovery and selection function (ANDSF) management object (MO), published Mar. 2016.*
(Continued)

*Primary Examiner* — Nishant Divecha
(74) *Attorney, Agent, or Firm* — Leydig, Voit & Mayer, Ltd.

(57) ABSTRACT

This application provides a service data flow sending method and apparatus. The method includes: receiving, by a data sending filter of user equipment (UE), a to-be-sent service data flow; obtaining, by the data sending filter, service domain name information corresponding to the to-be-sent service data flow; obtaining, by the data sending filter based on the service domain name information, a data sending pipeline corresponding to the to-be-sent service data flow; and sending, by the data sending filter, the to-be-sent service data flow by using the data sending pipeline. According to the service data flow sending method and apparatus in this application, a sending pipeline of a service data flow is determined in a relatively simple manner, thereby improving service data flow sending efficiency.

16 Claims, 6 Drawing Sheets

(51) Int. Cl.
*H04W 28/10* (2009.01)
*H04W 76/12* (2018.01)
*H04W 28/02* (2009.01)
*H04W 76/15* (2018.01)
*H04W 36/00* (2009.01)
*H04W 80/12* (2009.01)

(52) U.S. Cl.
CPC ........ *H04W 36/0022* (2013.01); *H04W 76/11* (2018.02); *H04W 76/15* (2018.02); *H04W 76/12* (2018.02); *H04W 80/12* (2013.01)

(58) Field of Classification Search
CPC ..... H04W 76/12; H04W 80/12; H04W 28/02; H04W 36/02; H04L 47/00; H04L 45/38; H04L 43/02
See application file for complete search history.

(56) References Cited

U.S. PATENT DOCUMENTS

| | | | |
|---|---|---|---|
| 2012/0140633 A1* | 6/2012 | Stanwood | H04L 47/2425 370/235 |
| 2012/0163341 A1 | 6/2012 | Shaheen et al. | |
| 2013/0170351 A1* | 7/2013 | Reznik | H04L 41/12 370/235 |
| 2014/0040504 A1* | 2/2014 | Gupta | H04W 76/11 709/244 |
| 2015/0052253 A1* | 2/2015 | Johnson | H04L 61/3045 709/226 |
| 2015/0271708 A1* | 9/2015 | Zaus | H04W 76/18 370/230 |
| 2016/0119870 A1 | 4/2016 | Chang et al. | |
| 2016/0157280 A1* | 6/2016 | Avila Gonzalez | H04L 12/2876 370/328 |

FOREIGN PATENT DOCUMENTS

| | | |
|---|---|---|
| CN | 102891855 A | 1/2013 |
| CN | 103401850 A | 11/2013 |
| CN | 103533527 A | 1/2014 |
| CN | 103974237 A | 8/2014 |
| CN | 104754657 A | 7/2015 |

OTHER PUBLICATIONS

Mockapetris, "Domain Names—Implementation and Specification," Request for Comments: 1035, Network Working Group, pp. 1-59 (Nov. 1987).

Braden, "Requirements for Internet Hosts—Application and Support," Request for Comments: 1123, Network Norking Group, pp. 1-98, Internet Engineering Task Force, Reston, Virginia (Oct. 1989).

* cited by examiner

SERVICE DATA FLOW SENDING METHOD AND APPARATUS

CROSS-REFERENCE TO RELATED APPLICATIONS

This application is a continuation of International Patent Application No. PCT/CN2016/081994, filed on May 13, 2016. The disclosure of the aforementioned application is hereby incorporated by reference in the entity.

TECHNICAL FIELD

This application relates to the field of service data processing technologies, and in particular, to a service data flow sending method and apparatus.

BACKGROUND

An evolved packet system (EPS) includes an evolved packet core (EPC), an evolved NodeB (eNB), and user equipment (UE). The EPC includes a mobility management entity (MME), a serving gateway (S-GW), a packet data network gateway (PDN-W), and the like.

In a typical communication scenario of the EPS, UE accesses a PDN by using a PDN connection. The PDN connection serves as an IP connection between the UE and the PDN, and includes one or more bearers from the UE to a PDN-W. In this communication scenario, each uplink or downlink service data flow needs to be matched with a corresponding bearer, and then is transmitted on the bearer. The service data flow is generally Internet Protocol (IP) packet data described by using a 5-tuple.

To match a service data flow with a corresponding bearer, a traffic flow template (TFT) is usually used to describe a correspondence between a service data flow and a bearer in the EPS, and the service data flow is matched, by using a filtering rule in the TFT, with the bearer corresponding to the service data flow.

In a method for matching the service data flow with the bearer, a sending bearer of the service data flow is determined by matching IP description information of the service data flow with an IP address of a service server. However, with development of mobile Internet, data centers (DC) of a third-party service provider gradually move to a lower location of a mobile network, and are deployed at various locations of the mobile network in a distributed manner. The DCs deployed in a distributed manner may provide a service for nearby UE by using PDN-Ws deployed in a distributed manner.

In this case, if an existing TFT load matching mode is still used, a problem of low service data flow sending efficiency may occur because all possible service server IP addresses cannot be loaded or a process of separately matching all possible loaded server IP addresses is very complex.

SUMMARY

This application provides a service data flow sending method and apparatus, to improve service data flow sending efficiency by determining a sending pipeline of a service data flow in a relatively simple manner.

According to a first aspect, this application provides a service data flow sending method, and the method includes:

receiving, by a data sending filter of user equipment UE, a to-be-sent service data flow;

obtaining, by the data sending filter, service domain name information corresponding to the to-be-sent service data flow;

obtaining, by the data sending filter based on the service domain name information, a data sending pipeline corresponding to the to-be-sent service data flow; and sending, by the data sending filter, the to-be-sent service data flow by using the data sending pipeline.

In this implementation, the UE obtains the service domain name information of the to-be-sent service data flow, and directly determines the corresponding data sending pipeline through matching based on the service domain name information. In this manner, the UE does not need to determine a pipeline by loading IP description information of the to-be-sent service data flow to a filter in a TFT one by one for comparing, and therefore an implementation process is relatively simple. Particularly, when there is a relatively large quantity of service server IP addresses, and the server IP addresses frequently change, there is no need to load the large quantity of server IP addresses and corresponding bearers when the method in this embodiment of the present invention is used to determine the sending pipeline of the to-be-sent service data flow. Therefore, problems that loading of the service server IP addresses fails and the data sending pipeline cannot be determined are avoided. It can be seen that according to the method in this embodiment of the present invention, the sending pipeline of the service data flow is determined in a relatively simple manner, and this is applicable to various types of data sending scenarios, thereby improving service data flow sending efficiency.

This implementation is not only applicable to a scenario in which the UE accesses a service described in an IP manner, but also applicable to a scenario in which the UE accesses a service described by using domain name information. The service described in an IP manner is generally a service described by using a 5-tuple (including a source IP address, a source port, a destination IP address, a destination port, and an IP protocol number). The service described by using domain name information is generally a service described by using a fully qualified domain name (FQDN), a uniform resource locator (URL), or application identifier (APP ID) information of the service. Specifically, when the service is described by using the APP ID information, the APP ID information includes an ID of an operating system in which an APP runs and an ID of the APP in the operating system. Optionally, the APP ID information further includes a version number of the operating system in which the APP runs or a version number of the APP.

Optionally, the obtaining, by the data sending filter, service domain name information corresponding to the to-be-sent service data flow includes:

obtaining, by the data sending filter, the service domain name information based on Internet Protocol IP description information of the to-be-sent service data flow.

In this implementation, after the to-be-sent service data flow is obtained, the service domain name information may be directly obtained based on the IP description information of the to-be-sent service data flow.

Optionally, the obtaining, by the data sending filter, the service domain name information based on IP description information of the to-be-sent service data flow includes:

obtaining, by the data sending filter, the service domain name information based on a correspondence rule between the IP description information of the to-be-sent service data flow and the service domain name information.

In this implementation, after the to-be-sent service data flow is received, the corresponding service domain name information may be directly found from the correspondence rule between the IP description information and the service domain name information by using the IP description information of the to-be-sent service data flow. Therefore, this implementation is simple.

Specifically, the data sending filter of the UE receives the to-be-sent service data flow from an application layer or an operating system of the UE. The to-be-sent service data flow is usually described by using a 5-tuple (including a source address, a destination address, a source port number, a destination port number, and an IP protocol number). However, in addition to an IP address, a service accessed by the UE is usually described by using a domain name, a URL, or APP ID information. To quickly allocate a data sending pipeline to a service data flow, in this implementation, a feature that the service data flow is usually described by using a 5-tuple is used, corresponding service domain name information is queried in a correspondence rule between IP description information of the service data flow and the service domain name information based on the IP description information of the service data flow, and then the data sending pipeline is matched by using the found domain name information. An implementation process is simple, and this implementation is more applicable to a service described by using a domain name, a URL, APP ID information, or the like.

Optionally, the correspondence rule between the IP description information of the to-be-sent service data flow and the service domain name information includes a first correspondence between the IP description information of the to-be-sent service data flow and IP description information of a service server, and a second correspondence between the IP description information of the service server and the service domain name information.

Optionally, the IP description information of the to-be-sent service data flow includes at least one of a source IP address, a destination IP address, a source port, and a destination port, and the IP description information of the service server includes at least one of a source IP address, a destination IP address, a source port, and a destination port; and the first correspondence includes one or more of the following correspondences:

a correspondence between the destination IP address of the service data flow and the source IP address of the service server;

a correspondence between the destination port of the service data flow and the source port of the service server;

a correspondence between the source IP address of the service data flow and a source address range in which access of the service server is allowed; and a correspondence between the source port of the service data flow and a source port range in which access of the service server is allowed.

In this implementation, filtering and matching may be performed on the IP description information of the service data flow. For example, an IP address of a corresponding service server is matched by using a destination address and a destination port of a service data flow.

Optionally, the service domain name information includes at least one of a domain name of a service, a uniform resource locator URL of the service, and application identifier APP ID information of the service; and the second correspondence includes one or more of the following correspondences:

a correspondence between the IP description information of the service server and the domain name of the corresponding service;

a correspondence between the IP description information of the service server and the URL of the corresponding service; and a correspondence between the IP description information of the service server and the APP ID information of the corresponding service.

In this implementation, after the IP description information of the service server corresponding to the to-be-sent service data flow is determined, the domain name of the corresponding service may be matched by using the IP description information that is of the service server and that is determined through matching, to facilitate matching of the data sending pipeline based on the domain name of the service.

Optionally, the method further includes:

obtaining, by the data sending filter, the correspondence rule between the IP description information of the to-be-sent service data flow and the service domain name information from an application layer or an operating system of the UE.

Optionally, the obtaining, by the data sending filter of the UE, service domain name information corresponding to the to-be-sent service data flow includes:

receiving, by the data sending filter, the service domain name information from an application layer or an operating system of the UE.

Optionally, the obtaining, by the data sending filter based on the service domain name information, a data sending pipeline corresponding to the to-be-sent service data flow includes:

obtaining, by the data sending filter based on a correspondence rule between the service domain name information and the data sending pipeline corresponding to the to-be-sent service data flow, the data sending pipeline corresponding to the to-be-sent service data flow.

Optionally, the correspondence rule between the service domain name information and the data sending pipeline includes one or more of the following correspondence rules:

a correspondence rule between the domain name of the service and the data sending pipeline;

a correspondence rule between the URL of the service and the data sending pipeline; and a correspondence rule between the APP ID information of the service and the data sending pipeline.

Specifically, the APP ID information includes an ID of an operating system that supports running of an APP and an ID of the APP in the operating system.

The APP ID information further includes a version number of the operating system that supports running of the APP and/or a version number of the APP.

Optionally, the method further includes:

obtaining, by the UE, the correspondence rule between the service domain name information and the data sending pipeline corresponding to the to-be-sent service data flow from a network device.

In this implementation, the network device formulates the rule based on a deployment location, quality of service, and session continuity of the service server.

The network device may be an access network discovery and selection function (ANDSF), an eNB, an MME, a PDN-W, an S-GW, a policy and charging rules function (PCRF), a flow delivery database (FD DB), or a service capability exposure function (SCEF).

Further, if the data sending filter does not find the corresponding data sending pipeline by using the service domain name information corresponding to the to-be-sent service data flow, or a rule corresponding to the data sending pipeline found by the data sending filter exceeds a preset valid time, the UE may query, in the foregoing network entity based on the service domain name information corresponding to the to-be-sent service data flow, the data sending pipeline corresponding to the to-be-sent service data flow.

Optionally, the data sending pipeline includes a packet data network PDN connection, a bearer, or a radio access technology (RAT) used for sending a service data flow.

In this implementation, the UE may directly obtain, by querying a rule, the PDN connection of the to-be-sent service data flow, the bearer of the to-be-sent service data flow, or the radio access technology used for the service data flow sending. An implementation is simple and quick, and may meet matching of data sending pipelines with different granularities.

Particularly, when allocating a RAT to a service data flow, because different RATs have different air interface features, for example, different RATs have different quality of service (QoS), maximum bandwidth, and coverage areas, the different RATs are used to transmit different service data flows. In this manner, different RATs may be allocated to different service data flows in a simple and quick manner, to meet requirements of the service data flows for different transmission air interface features.

According to a second aspect, an embodiment of the present invention provides a service data flow sending method, including:

receiving, by a data sending filter of user equipment UE, a to-be-sent service data flow;

querying, by the data sending filter based on IP description information of the to-be-sent service data flow, a data sending pipeline corresponding to the to-be-sent service data flow; and sending, by the data sending filter, the to-be-sent service data flow by using the found data sending pipeline.

In this implementation, the data sending pipeline corresponding to the to-be-sent service data flow is queried based on the IP description information of the to-be-sent service data flow, and then the data sending pipeline for sending the to-be-sent service data flow is directly determined based on a query result. There is no need to load a server IP address of a to-be-accessed service, and there is no need to perform TFT matching. Therefore, a process of determining a sending pipeline of a service data flow is simplified. Particularly, when there is a relatively large quantity of service server IP addresses, and the server IP addresses frequently change, there is no need to load the large quantity of server IP addresses and corresponding bearers when the method in this embodiment of the present invention is used to determine the sending pipeline of the to-be-sent service data flow. Therefore, problems that loading of the service server IP addresses fails and the data sending pipeline cannot be determined are avoided. It can be seen that according to the method in this embodiment of the present invention, the sending pipeline of the service data flow is determined in a relatively simple manner, and this is applicable to various types of data sending scenarios, thereby improving service data flow sending efficiency.

Optionally, the querying, by the data sending filter based on IP description information of the to-be-sent service data flow, a data sending pipeline corresponding to the to-be-sent service data flow includes:

querying, by the data sending filter based on a correspondence rule that is between the IP description information of the to-be-sent service data flow and the data sending pipeline and that is stored in the UE, the data sending pipeline corresponding to the to-be-sent service data flow.

According to a third aspect, an embodiment of the present invention provides a service data flow sending apparatus, including a processor and a memory, where the memory is configured to store program code; and the processor is configured to perform the following operations based on the program code stored in the memory:

receiving a to-be-sent service data flow;

obtaining service domain name information corresponding to the to-be-sent service data flow;

obtaining, based on the service domain name information, a data sending pipeline corresponding to the to-be-sent service data flow; and sending the to-be-sent service data flow by using the data sending pipeline.

Optionally, the obtaining service domain name information corresponding to the to-be-sent service data flow includes:

obtaining the service domain name information based on Internet Protocol IP description information of the to-be-sent service data flow.

Optionally, the obtaining the service domain name information based on IP description information of the to-be-sent service data flow includes:

obtaining the service domain name information based on a correspondence rule between the IP description information of the to-be-sent service data flow and the service domain name information.

Optionally, the correspondence rule between the IP description information of the to-be-sent service data flow and the service domain name information includes a first correspondence between the IP description information of the to-be-sent service data flow and IP description information of a service server, and a second correspondence between the IP description information of the service server and the service domain name information.

Optionally, the apparatus further includes an application layer and an operating system; and the obtaining service domain name information corresponding to the to-be-sent service data flow includes:

receiving the service domain name information from the application layer module or the operating system module.

Optionally, the obtaining, based on the service domain name information, a data sending pipeline corresponding to the to-be-sent service data flow includes:

obtaining, based on a correspondence rule between the service domain name information and the data sending pipeline corresponding to the to-be-sent service data flow, the data sending pipeline corresponding to the to-be-sent service data flow.

According to a fourth aspect, an embodiment of the present invention provides a service data flow sending apparatus, including a processor and a memory, where the memory is configured to store program code; and the processor is configured to perform the following operations based on the program code stored in the memory:

receiving a to-be-sent service data flow;

querying, based on IP description information of the to-be-sent service data flow, a data sending pipeline corresponding to the to-be-sent service data flow; and sending the to-be-sent service data flow by using the found data sending pipeline.

Optionally, the querying, based on IP description information of the to-be-sent service data flow, a data sending pipeline corresponding to the to-be-sent service data flow includes:

querying, based on a correspondence rule that is between the IP description information of the to-be-sent service data flow and the data sending pipeline and that is stored in UE, the data sending pipeline corresponding to the to-be-sent service data flow.

Optionally, the operations performed by the processor further include:

obtaining the correspondence rule between the IP description information of the to-be-sent service data flow and the data sending pipeline from a network device.

BRIEF DESCRIPTION OF DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

DESCRIPTION OF EMBODIMENTS

An internal system architecture of UE generally includes an application layer, an operating system, and a data transmission layer. After a service data flow is generated at the application layer, the service data flow is transmitted to the data transmission layer by using the application layer or the operating system. A data pipeline is matched for the service data flow at the data transmission layer. The service data flow is sent by using the matched data pipeline.

Based on the system architecture of the UE, this application provides a service data flow sending method. The method is mainly applied to a Long Term Evolution (LTE) network and a subsequent evolved cellular communications system that are defined by the 3rd Generation Partnership Project (3GPP). The method may be further applied to an access technology controlled by the cellular communications system, for example, trusted access and untrusted access in a wireless local area network (WLAN) defined by the 3GPP, and for another example, an LWA access technology in which LTE and WLAN are aggregated for access.

In addition, UE in this application may be a handheld device, an in-vehicle device, a wearable device, or a computing device that has a wireless communication function or another processing device connected to a wireless modem, or user equipment (UE), a mobile station (MS), a terminal, a terminal device and the like that are in various forms. For ease of description, in this application, these devices are simply referred to as user equipment or UE.

Figure 1:
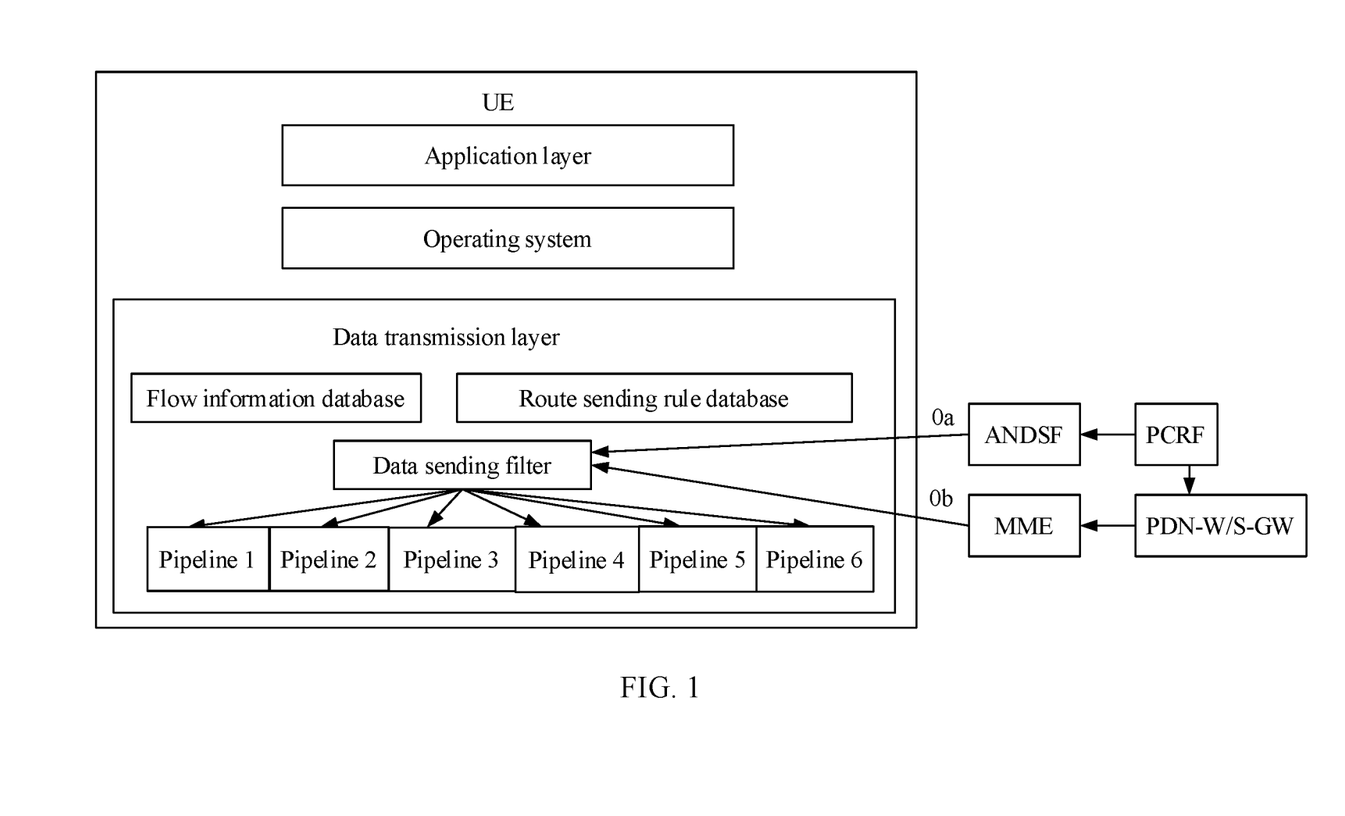
FIG. 1 is a schematic diagram of an internal system architecture of UE.

FIG. 1 is a schematic diagram of an internal system architecture of UE. As shown in FIG. 1, a data sending filter is deployed at a data transmission layer. The data sending filter is configured to allocate a data sending pipeline such as a pipeline 1, a pipeline 2, . . . , or a pipeline 6 in FIG. 1 to a to-be-sent service data flow. The data sending pipeline may be a PDN connection, a bearer, or a RAT used for sending a service data flow. In addition, the data sending filter may further receive data from a network device. The network device may be one or more of an ANDSF, an eNB, an MME, a PDN-W, an S-GW, a PCRF, an FD DB, and an SCEF (only the ANDSF, PCRF, MME, PDN-W, and S-GW are marked in FIG. 1). Optionally, the data sending filter may be a data sending filter, and is configured to allocate a received to-be-sent service data flow to a corresponding sending pipeline based on a preset rule (for example, a routing rule). Optionally, as shown in FIG. 1, in addition to the data sending filter, a flow information database and a rout sending rule database are further deployed at the data transmission layer.

Figure 2:
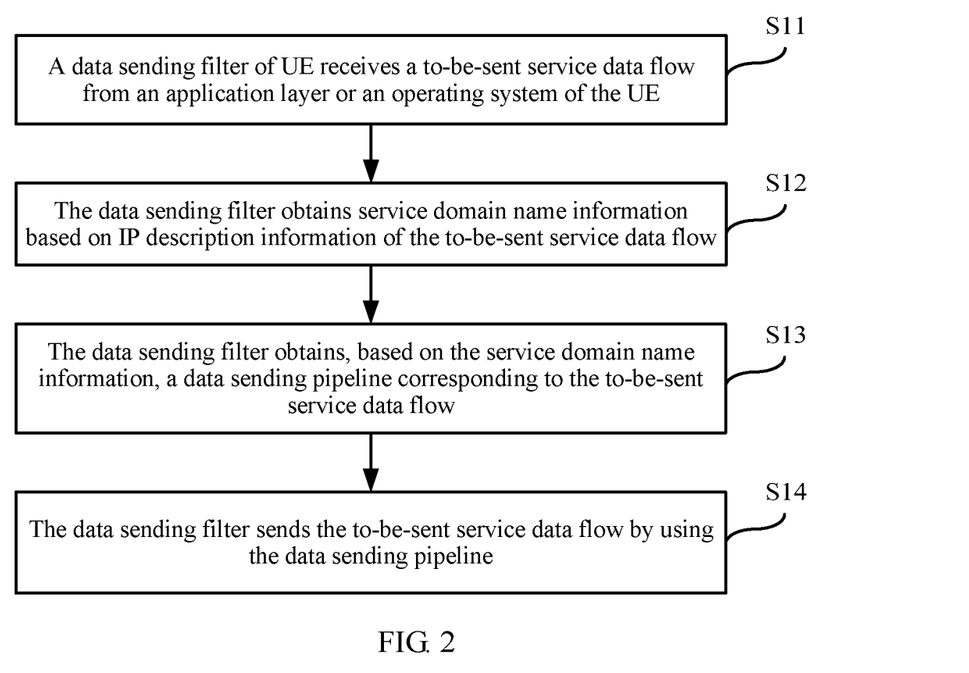
FIG. 2 is a flowchart of an embodiment of a service data flow sending method according to this application.

FIG. 2 is a flowchart of an embodiment of a service data flow sending method according to this application, and the service data flow sending method includes the following steps.

Step S11: A data sending filter of UE receives a to-be-sent service data flow from an application layer or an operating system of the UE.

Step S12: The data sending filter obtains service domain name information based on IP description information of the to-be-sent service data flow.

The to-be-sent service data flow received by the UE in step S11 is usually described by using the IP description information. Specifically, the IP description information may be 5-tuple information (including a source IP address, a source port, a destination IP address, a destination port, and an IP protocol number).

An implementation of obtaining, by the data sending filter, the service domain name information based on the IP description information of the service data flow may be as follows: A flow information database prestores a correspondence rule between the IP description information of the service data flow and the service domain name information. Optionally, the correspondence rule between the IP description information of the service data flow and the service domain name information may be preconfigured by the UE, or may be obtained by the UE from a network device. Optionally, the data sending filter may obtain the rule from an ANDSF, an eNB, an MME, a PDN-W, an S-GW, a PCRF, an FD DB, or an SCEF.

Step S13: The data sending filter obtains, based on the service domain name information, a data sending pipeline corresponding to the to-be-sent service data flow.

A manner of obtaining, by the data sending filter based on the service domain name information, the data sending pipeline corresponding to the to-be-sent service data flow is as follows:

A rout sending rule database of the UE prestores a correspondence rule between the service domain name information and the data sending pipeline. The data sending filter queries the corresponding data sending pipeline in the rout sending rule database based on the service domain name information.

Optionally, the correspondence rule between the service domain name information and the data sending pipeline may be preconfigured by the UE, or may be obtained by the UE from a network device. Optionally, the data sending filter may obtain the rule from an ANDSF, an eNB, an MME, a PDN-W, an S-GW, a PCRF, an FD DB, or an SCEF.

Step S14: The data sending filter sends the to-be-sent service data flow by using the data sending pipeline.

In this embodiment of the present invention, when finding the data sending pipeline corresponding to the to-be-sent service data flow from the rout sending rule database, the data sending filter sends the to-be-sent service data flow by using the found data sending pipeline.

Optionally, when the data sending filter does not find the service domain name information corresponding to the to-be-sent service data flow from the flow information database, or when the data sending filter does not find, from the rout sending rule database, the data sending pipeline that matches the to-be-sent service data flow, or when a matching rule of the data sending pipeline found by the data sending filter from the rout sending rule database exceeds a valid cycle, the data sending filter sends the to-be-sent service data flow by using a default data sending pipeline of the UE.

Optionally, when there is a matching rule exceeding a valid life cycle in the correspondence rule between the service domain name information and the data sending pipeline in the rout sending rule database, the matching rule exceeding the valid life cycle is deleted.

It should be noted that the flow information database, the rout sending rule database, and the data sending filter of the UE may be integrated, or may be separated, and may be implemented at any one of the operating system, the application layer, and a data transmission layer.

Optionally, the service data flow sending method in this application may work with a filter in a TFT in which an IP 5-tuple is used as a flow description, an ANDSF rule, and the like in a conventional method. Specifically, a priority may be given to the service data flow sending method in this application, or a priority may be given to a TFT matching rule and the ANDSF rule in a conventional technology, or priorities are mixed and sorted.

The method in this application supports a mobile-Internet-oriented scenario in which a large quantity of servers are deployed and the servers are frequently updated. Further, the method in this application may support a 5G-oriented ultra-flattened network architecture in which services are deployed in a distributed manner and core network access is agnostic.

Figure 3:
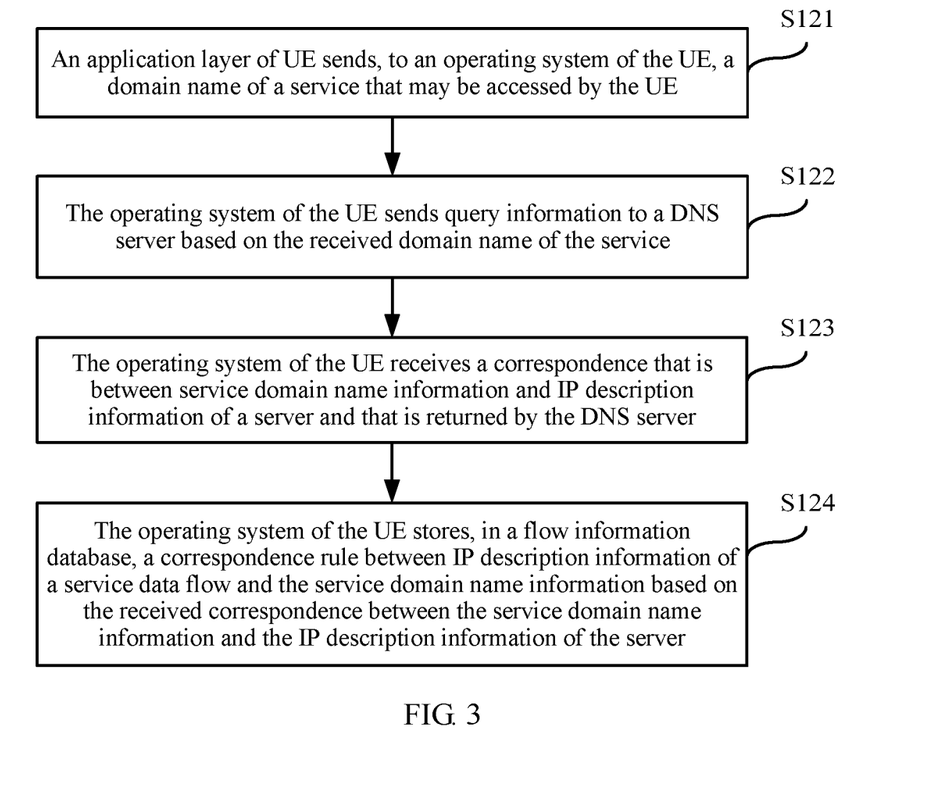
FIG. 3 is a flowchart of a method for obtaining, by UE, a correspondence rule between IP description information of a service data flow and service domain name information.

FIG. 3 is a flowchart of a method for obtaining, by UE, a correspondence rule between IP description information of a service data flow and service domain name information. As shown in FIG. 3, the method includes the following main processing steps.

Step S121: An application layer of UE sends, to an operating system of the UE, a domain name of a service that may be accessed by the UE.

Step S122: The operating system of the UE sends query information to a domain name system (DNS) server based on the received domain name of the service.

Step S123: The operating system of the UE receives a correspondence that is between service domain name information and IP description information of a service server and that is returned by the DNS server.

Optionally, the correspondence that is between the service domain name information and the IP description information of the server and that is received by the operating system of the UE includes: a correspondence between an FQDN of the service that may be accessed by the UE and the IP description information of the service server, and/or a correspondence between a URL and/or APP ID information of the service that may be accessed by the UE and the IP description information of the service server.

The IP description information of the service server includes at least one of a source IP address, a destination IP address, a source port, a destination port, and an IP protocol number of the service server.

Optionally, the APP ID information includes an ID of an operating system in which an APP runs and an ID of the APP in the operating system. Optionally, the APP ID information further includes a version number of the operating system in which the APP runs or a version number of the APP.

Step S124: The operating system of the UE stores, in a flow information database, a correspondence rule between IP description information of a service data flow and the service domain name information based on the received correspondence between the service domain name information and the IP description information of the service server.

Specifically, the correspondence rule between the IP description information of the service data flow and the service domain name information includes a first correspondence between the IP description information of the service data flow and the IP description information of the service server, and a second correspondence between the IP description information of the service server and the service domain name information.

The first correspondence includes one or more of the following correspondences:

a correspondence between a destination IP address of the service data flow and the source IP address of the service server;

a correspondence between a destination port of the service data flow and the source port of the service server;

a correspondence between a source IP address of the service data flow and a source address range in which access of the service server is allowed; and a correspondence between a source port of the service data flow and a source port range in which access of the service server is allowed.

For example, during specific implementation, when it is set that a destination IP address of a service data flow is consistent with a source IP address of a service server, and a destination port of the service data flow is consistent with a source port of the service server, a correspondence between the service server and the matched service data flow is determined. Then, corresponding service domain name information may be determined by using the matched service server.

When filtering and matching are performed on the service data flow by using the IP description information of the service server, the source IP address and the source port of the service data flow may be further limited. For example, a source address range of a service data flow that is allowed to match with a service server whose IP address is 1.1.14 is 2.2.01 to 2.2.11. In this case, further matching can be performed on only a service data flow whose source IP address is within the corresponding specified range.

The domain name information of the domain name of the service includes the domain name, the URL, and the APP ID information of the service.

The second correspondence includes one or more of the following correspondences:

a correspondence between the IP description information of the service server and the domain name of the corresponding service;

a correspondence between the IP description information of the service server and the URL of the corresponding service; and a correspondence between the IP description information of the service server and the APP ID information of the corresponding service.

In this embodiment of the present invention, after a service server corresponding to a service data flow is determined, service domain name information corresponding to the service data flow is determined based on a relationship between IP description information of the service server and the service domain name information. Specifically, a domain name, a URL, and APP ID information of a service corresponding to the service data flow are determined.

A processing process in which UE obtains a correspondence rule between service domain name information and a data sending pipeline includes:

(1) A data sending filter of the UE receives the correspondence rule that is between the service domain name information and the data sending pipeline and that is formulated by a network device. A network entity that formulates the rule may be one or more of an ANDSF, an eNB, an MME, a PDN-W, an S-GW, a PCRF, an FD DB, and an SCEF.

As shown in FIG. 1, the data sending filter may use a manner shown in 0a. To be specific, the data sending filter receives the correspondence rule that is between the service domain name information and the data sending pipeline and that is sent by a user plane entity. Optionally, the user plane entity may be an ANDSF.

Alternatively, the data sending filter uses a manner shown in 0b. To be specific, the data sending filter receives the correspondence rule that is between the service domain name information and the data sending pipeline and that is sent by a control plane entity. Optionally, the control plane entity may be an MME. The MME may send the correspondence rule between the service domain name information and the data sending pipeline to the data sending filter of the UE by using a non-access stratum (NAS). When the correspondence rule between the service domain name information and the data sending pipeline is sent to the data sending filter of the UE by using the NAS, the rule may serve as an addition to a TFT, in other words, when a flow filter included in the TFT performs filtering and matching on a service data flow, a limitation of performing matching by using only IP information may be broken.

The correspondence rule that is between the service domain name information and the data sending pipeline and that is sent by the MME or the ANDSF may originally come from a PCRF.

(2) The data sending filter stores, in a rout sending rule database, the correspondence rule that is between the service domain name information and the data sending pipeline and that is obtained from the network device, to support the data sending filter query the data sending pipeline.

In this application, the correspondence rule between the service domain name information and the data sending pipeline includes:

a correspondence rule between an FQDN, a URL, or APP ID information of a service and the data sending pipeline. The data sending pipeline may be a PDN connection, a bearer, or a RAT used for sending a service data flow.

Optionally, in the correspondence rule between the service domain name information and the data sending pipeline, some content in the service domain name information may be replaced with a wildcard, for example, '?' is used to represent any one character, and '*' is used to represent any plurality of characters.

For example, a typical format of the FQDN is abc.alice.com, where '?' may be used to represent one of characters, for example, '?bc.alice.com', and '?' represents any one character in this domain name. In addition, '*' may be used to represent character content separated by using '.' in the FQDN, for example, '*.alice.com' is used to represent one FQDN, and a part represented by '*' may be any plurality of characters.

Further, some content of the URL may also be represented by using a wildcard. For example, a standard format of the URL is as follows:

protocol type://server address (a port number needs to be added if necessary)/path/file name.

A specific example of the URL may be: https://www.alice.com/book/new.txt.

When a wildcard is used in the URL, the URL may be represented as http?://www.alice.com/book/*.txt, where '?' represents any one character, and a part represented by '*' may be any plurality of characters.

Based on the foregoing descriptions, content of the APP ID information may also be marked by using a wildcard.

According to the method in this embodiment of the present invention, service domain name information determined based on IP description information of a to-be-sent service data flow is usually a determined domain name, for example, 'abc.alice.com', and service domain name information in a prestored correspondence rule between the service domain name information and a data sending pipeline may include a wildcard, for example, '*.alice.com', 'a?c.alice.com', or '*bc.alice.*'. When the service domain name information of the to-be-sent service data flow complies with a format of domain name information that includes a wildcard in the rout sending rule database, a data sending pipeline corresponding to the service domain name information that includes a wildcard is determined as a sending pipeline of the to-be-sent service data flow.

Optionally, each correspondence that is between service domain name information and a data sending pipeline and that is included in the rout sending rule database is marked with a valid life cycle. If the valid life cycle is exceeded, the corresponding correspondence between the service domain name information and the data sending pipeline is invalid. The UE may delete the invalid correspondence between the service domain name information and the data sending pipeline.

Optionally, the network device (for example, a PCRF, an ANDSF, or an MME) may formulate the correspondence rule between the service domain name information and the data sending pipeline based on factors such as a deployment location, a quality of service requirement, and a session continuity requirement for accessing a service by the UE.

For example, when the UE deploys a nearby service of abc1.alice.com, abc1.alice.com may be configured for a nearby pipeline (a bearer, a PDN connection, or a RAT) that can be accessed by the UE.

When a service of abc2.alice.com requires a high quality of service guarantee, abc2.alice.com may be configured for a pipeline (a bearer, a PDN connection, or a RAT) that can provide high quality of service.

When a service of abc3.alice.com service requires a high session continuity guarantee, abc3.alice.com may be configured for a pipeline (a bearer, a PDN connection, or a RAT) that can provide relatively high mobility (a mobility anchor is deployed at a relatively high location).

Optionally, the rule in this embodiment may alternatively be configured by a third party, for example, a third party that provides an Internet service configures content of the rule by using an API interface.

According to the service data flow sending method in this application, the UE simply and quickly allocates a data sending pipeline to a to-be-sent service data flow based on a rout sending rule configured by the network device, thereby meeting a realistic requirement for sending the service data flow.

Figure 4:
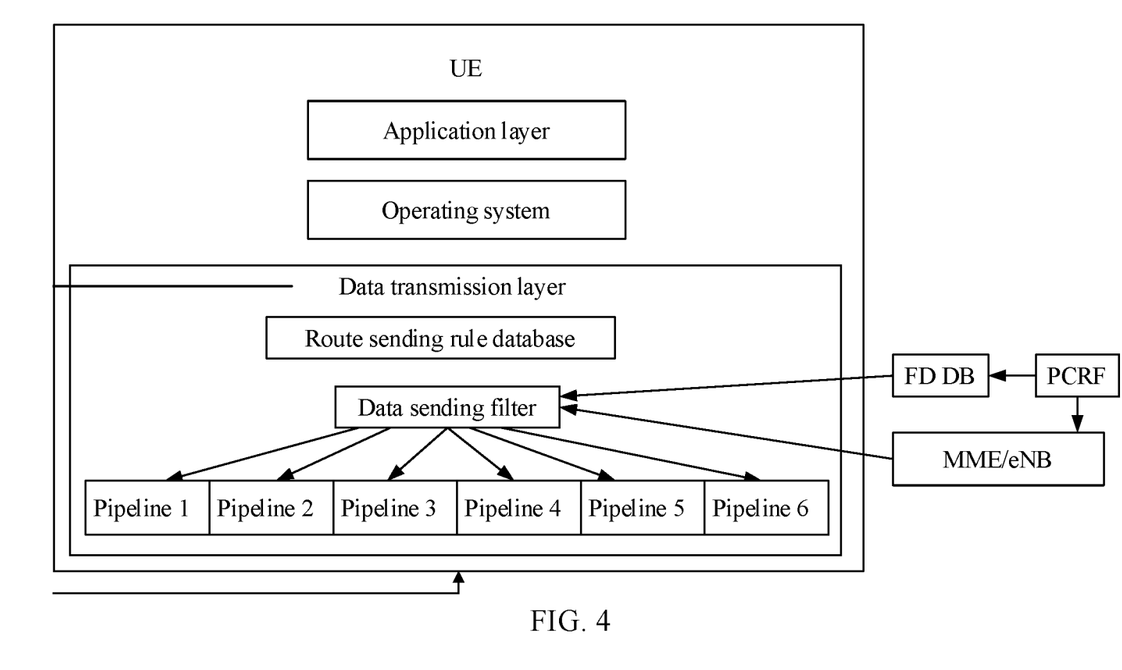
FIG. 4 is a schematic diagram of another internal system architecture of UE.

FIG. 4 is a schematic diagram of another internal system architecture of UE. In comparison with the internal system architecture shown in FIG. 1, a difference lies only in that external network entities connected to a data sending filter are an eNB, an MME, an FD DB, and an SCEF in the internal system architecture of the UE shown in FIG. 4. Other structures are the same as those in FIG. 1. Details are not described herein again.

Figure 5:
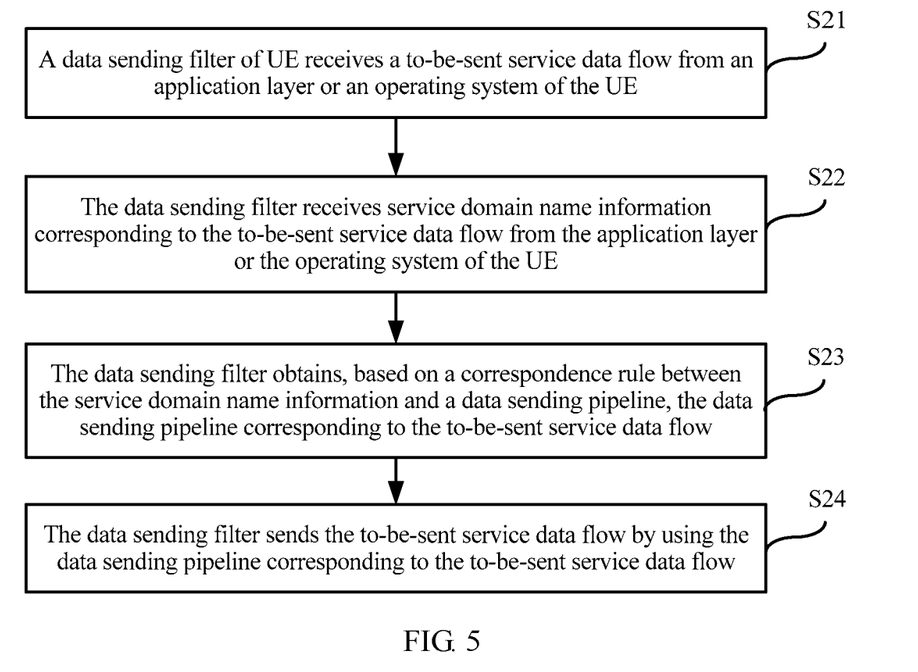
FIG. 5 is a flowchart of another embodiment of a service data flow sending method according to this application.

FIG. 5 is a flowchart of another embodiment of a service data flow sending method according to this application, and the service data flow sending method includes the following steps.

Step S21: A data sending filter of UE receives a to-be-sent service data flow from an application layer or an operating system of the UE.

Step S22: The data sending filter receives service domain name information corresponding to the to-be-sent service data flow from the application layer or the operating system of the UE.

Optionally, the data sending filter simultaneously sends the to-be-sent service data flow and the service domain name information corresponding to the to-be-sent service data flow to the data sending filter.

The service domain name information obtained by the application layer or the operating system of the UE may be configured by the application layer or the operating system, or may be obtained from a network device.

The application layer or the operating system of the UE may configure the service domain name information in the following manner: The application layer or the operating system of the UE may determine, based on an access operation performed by a user on a page or an application, the service domain name information corresponding to the to-be-sent service data flow when generating the to-be-sent service data flow.

Further, the service domain name information sent by the application layer or the operating system of the UE to the data sending filter may include an FQDN, a URL, or APP ID information of a service. The APP ID information includes an ID of an operating system in which an APP runs, and an ID of the APP in the operating system. Optionally, the APP ID information further includes a version number of the operating system in which the APP runs or a version number of the APP.

Step S23: The data sending filter obtains, based on a correspondence rule between the service domain name information and a data sending pipeline, the data sending pipeline corresponding to the to-be-sent service data flow.

In this embodiment of the present invention, a format of the service domain name information and a matching rule between the service domain name information and the data sending pipeline are the same as those in the method in FIG. 3. Details are not described again.

Optionally, a rout sending rule database of the UE pre-stores the correspondence rule between the service domain name information and the data sending pipeline. After obtaining the service domain name information corresponding to the to-be-sent service data flow from the application layer or the operating system of the UE, the data sending filter queries the corresponding data sending pipeline in the rout sending rule database by using the service domain name information corresponding to the to-be-sent service data flow.

Further, the correspondence rule between the service domain name information and the data sending pipeline may be preconfigured by the UE, or may be obtained by the UE from a network device. Optionally, the data sending filter may obtain the rule from an ANDSF, an eNB, an MME, a PDN-W, an S-GW, a PCRF, an FD DB, or an SCEF.

Step S24: The data sending filter sends the to-be-sent service data flow by using the data sending pipeline corresponding to the to-be-sent service data flow.

It should be noted that when the data sending filter does not find, from the rout sending rule database, the data sending pipeline that matches the to-be-sent service data flow, or a matching rule of the data sending pipeline found by the data sending filter from the rout sending rule database exceeds a valid cycle, the data sending filter sends the to-be-sent service data flow by using a default data sending pipeline of the UE.

In addition, when there is a matching rule exceeding a valid life cycle in the correspondence rule between the service domain name information and the data sending pipeline in the rout sending rule database, the matching rule exceeding the valid life cycle is deleted.

It should be noted that the rout sending rule database and the data sending filter of the UE may be integrated, or may be separated, and may be implemented at any one of the operating system, the application layer, and a data transmission layer.

In addition, the service data flow sending method in this application may work with a filter in a TFT in which an IP 5-tuple is used as a flow description, an ANDSF rule, and the like in a conventional method. Specifically, a priority may be given to the service data flow sending method in this application, or a priority may be given to a TFT matching rule and the ANDSF rule in a conventional technology, or priorities are mixed and sorted.

The service data flow sending method in this application may support a 5G-oriented ultra-flattened network architecture in which services are deployed in a distributed manner and core network access is agnostic, and support a mobile-Internet-oriented scenario in which a large quantity of servers are deployed and are frequently updated.

In the method in this application, the UE stores a correspondence rule between a service data flow and a data sending pipeline, to avoid a case in which storage and computing resources of the UE are wasted because the network device sends a large amount of redundant information to the UE.

Figure 6:
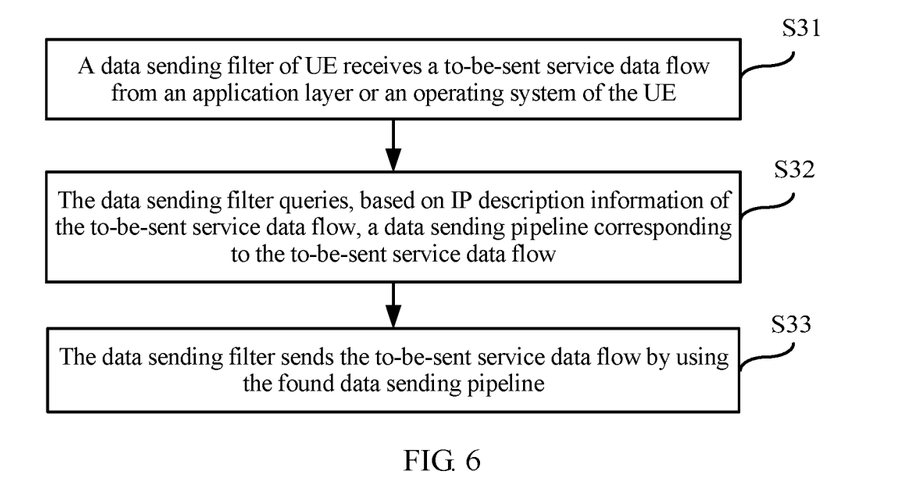
FIG. 6 is a flowchart of still another embodiment of a service data flow sending method according to this application.

FIG. 6 is a flowchart of still another embodiment of a service data flow sending method according to this application, and the service data flow sending method includes the following steps.

Step S31: A data sending filter of UE receives a to-be-sent service data flow from an application layer or an operating system of the UE.

The to-be-sent service data flow is usually described by using IP description information. Specifically, the IP description information may be 5-tuple information (including a source IP address, a source port, a destination IP address, a destination port, and an IP protocol number).

Step S32: The data sending filter queries, based on IP description information of the to-be-sent service data flow, a data sending pipeline corresponding to the to-be-sent service data flow.

In this embodiment of the present invention, a manner of querying, by the data sending filter, the data sending pipeline based on the IP description information of the to-be-sent service data flow is as follows: A rout sending rule database of the UE may prestore a correspondence rule between the IP description information of the service data flow and the data sending pipeline. When receiving the to-be-sent service data flow, the data sending filter queries, in rout sending rule database by using the IP description information of the to-be-sent service data flow, the data sending pipeline corresponding to the to-be-sent service data flow.

The correspondence rule between the IP description information of the service data flow and the data sending pipeline may be preconfigured by the UE, or may be obtained by the UE from a network device. Optionally, the data sending filter may obtain the correspondence rule between the IP description information of the service data flow and the data sending pipeline from an ANDSF, an eNB, an MME, a PDN-W, an S-GW, a PCRF, an FD DB, or an SCEF.

Further, the IP description information of the service data flow includes at least one of a source IP address, a destination IP address, a source port, and a destination port.

The correspondence rule between the IP description information of the service data flow and the data sending pipeline includes at least one or more of the following correspondence rules:

a correspondence rule between the destination IP address of the service data flow and the data sending pipeline;

a correspondence rule between the source IP address of the service data flow and the data sending pipeline;

a correspondence rule between the destination port of the service data flow and the data sending pipeline; and a correspondence rule between the source port of the service data flow and the data sending pipeline.

In this embodiment of the present invention, the data sending pipeline may be a PDN connection, a bearer, or a RAT used for sending a service data flow.

Step S33: The data sending filter sends the to-be-sent service data flow by using the found data sending pipeline.

In this embodiment of the present invention, when the data sending filter does not find the data sending pipeline corresponding to the to-be-sent service data flow from the rout sending rule database, or a matching rule of the found data sending pipeline exceeds a valid cycle, the data sending filter sends the to-be-sent service data flow by using a default data sending pipeline of the UE.

It should be noted that the rout sending rule database and the data sending filter of the UE may be integrated, or may be separated, and may be implemented at any one of the operating system, the application layer, and a data transmission layer.

Further, the service data flow sending method in this application may work with a filter in a TFT in which an IP 5-tuple is used as a flow description, an ANDSF rule, and the like in a conventional method. Specifically, a priority may be given to the service data flow sending method in this application, or a priority may be given to a TFT matching rule and the ANDSF rule in a conventional technology, or priorities are mixed and sorted.

The service data flow sending method in this application may support a 5G-oriented ultra-flattened network architecture in which services are deployed in a distributed manner and core network access is agnostic, and support a mobile-Internet-oriented scenario in which a large quantity of servers are deployed and are frequently updated.

In the method in this application, the UE stores a correspondence rule between a service data flow and a data sending pipeline, to avoid a case in which storage and computing resources of the UE are wasted because the network device sends a large amount of redundant information to the UE.

Figure 7:
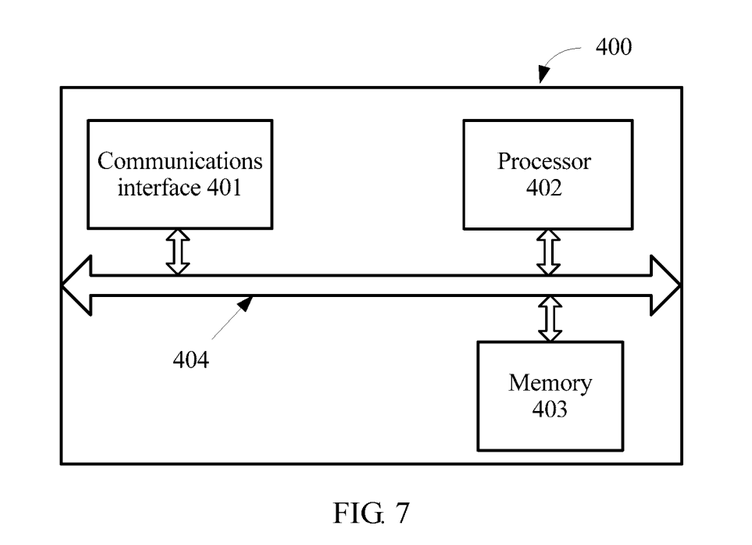
FIG. 7 is a schematic structural diagram of a service data flow sending apparatus according to this application.

FIG. 7 is a schematic structural diagram of a service data flow sending apparatus according to this application. As shown in FIG. 7, the service data flow sending apparatus includes a processor 402, a memory 403, and a communications interface 401. The processor 402, the memory 403, and the communications interface 401 are connected by using a communications bus 404. The communications bus 404 may be a peripheral component interconnect (PCI) bus, an extended industry standard architecture (EISA) bus, or the like. The communications bus 404 may be classified into an address bus, a data bus, a control bus, and the like. For ease of indication, the bus is indicated by using only one bold line in FIG. 7. However, it does not indicate that there is only one bus or only one type of bus.

The communications interface 401 is configured to receive data from and send data to an external device (for example, a network device). For example, data processed by the processor 402 may be transferred to the external device by using the communications interface 401.

The memory 403 is configured to store a program. Specifically, the program may include program code, and the program code includes a computer operation instruction. The memory 403 may include a random access memory (RAM), and may further include a non-volatile memory, for example, at least one magnetic disk storage. Only one processor is shown in the figure. Certainly, there may be a plurality of processors 403 based on a requirement. Optionally, the application layer or the operating system in FIG. 1 and FIG. 4 may be stored in the memory 403. Certainly, an application layer or an operating system in this application may alternatively be implemented by another processor, or implemented through mutual cooperation between the processor 402 and the memory 403.

Optionally, the processor 402 may be a baseband chip, and is configured to implement a data transmission layer in this application. Specifically, the processor 402 may implement a data sending filter in this application. Optionally, the processor 402 may include a flow information database and a rout sending rule database in this application. Optionally, the flow information database and the rout sending rule database in this application may alternatively be included in the memory 403.

The service data flow sending apparatus shown in FIG. 7 may be configured to perform the service data flow sending method provided in this application. The processor 402 performs the following operations based on the program code stored in the memory 403:

receiving a to-be-sent service data flow;

obtaining service domain name information corresponding to the to-be-sent service data flow;

obtaining, based on the service domain name information, a data sending pipeline corresponding to the to-be-sent service data flow; and sending the to-be-sent service data flow by using the data sending pipeline.

Optionally, the obtaining service domain name information corresponding to the to-be-sent service data flow includes:

obtaining the service domain name information based on Internet Protocol IP description information of the to-be-sent service data flow.

Optionally, the obtaining the service domain name information based on IP description information of the to-be-sent service data flow includes:

obtaining the service domain name information based on a correspondence rule between the IP description information of the to-be-sent service data flow and the service domain name information.

Optionally, the correspondence rule between the IP description information of the to-be-sent service data flow and the service domain name information includes a first correspondence between the IP description information of the to-be-sent service data flow and IP description information of a service server, and a second correspondence between the IP description information of the service server and the service domain name information.

Optionally, the IP description information of the to-be-sent service data flow includes at least one of a source IP address, a destination IP address, a source port, and a destination port, and the IP description information of the service server includes at least one of a source IP address, a destination IP address, a source port, and a destination port.

The first correspondence includes one or more of the following correspondences:

a correspondence between the destination IP address of the service data flow and the source IP address of the service server;

a correspondence between the destination port of the service data flow and the source port of the service server;

a correspondence between the source IP address of the service data flow and a source address range in which access of the service server is allowed; and a correspondence between the source port of the service data flow and a source port range in which access of the service server is allowed.

Optionally, the service domain name information includes at least one of a domain name of a service, a uniform resource locator URL of the service, and application identifier APP ID information of the service.

The second correspondence includes one or more of the following correspondences:

a correspondence between the IP description information of the service server and the domain name of the corresponding service;

a correspondence between the IP description information of the service server and the URL of the corresponding service; and a correspondence between the IP description information of the service server and the APP ID information of the corresponding service.

Optionally, the apparatus shown in FIG. 7 further includes an application layer and an operating system.

The operations performed by the processor 402 further include:

obtaining the correspondence rule between the IP description information of the to-be-sent service data flow and the service domain name information from the application layer or the operating system.

Optionally, the apparatus shown in FIG. 7 further includes an application layer and an operating system.

The obtaining service domain name information corresponding to the to-be-sent service data flow includes:

receiving the service domain name information from the application layer module or the operating system module.

Optionally, the obtaining, based on the service domain name information, a data sending pipeline corresponding to the to-be-sent service data flow includes:

obtaining, based on a correspondence rule between the service domain name information and the data sending pipeline corresponding to the to-be-sent service data flow, the data sending pipeline corresponding to the to-be-sent service data flow.

Optionally, the correspondence rule between the service domain name information and the data sending pipeline includes one or more of the following correspondence rules:

a correspondence rule between the domain name of the service and the data sending pipeline;

a correspondence rule between the URL of the service and the data sending pipeline; and a correspondence rule between the APP ID information of the service and the data sending pipeline.

Optionally, the operations performed by the processor 402 further include:

obtaining the correspondence rule between the service domain name information and the data sending pipeline corresponding to the to-be-sent service data flow from a network device.

Optionally, the data sending pipeline includes a packet data network PDN connection, a bearer, or a radio access technology RAT used for sending a service data flow.

The service data flow sending apparatus shown in FIG. 7 may further perform the following operations:

receiving a to-be-sent service data flow;

querying, based on IP description information of the to-be-sent service data flow, a data sending pipeline corresponding to the to-be-sent service data flow; and sending the to-be-sent service data flow by using the found data sending pipeline.

Optionally, the querying, based on IP description information of the to-be-sent service data flow, a data sending pipeline corresponding to the to-be-sent service data flow includes:

querying, based on a correspondence rule that is between the IP description information of the to-be-sent service data flow and the data sending pipeline and that is stored in UE, the data sending pipeline corresponding to the to-be-sent service data flow.

Optionally, the IP description information of the service data flow includes at least one of a source IP address, a destination IP address, a source port, and a destination port.

The correspondence rule between the IP description information of the service data flow and the data sending pipeline includes at least one or more of the following correspondence rules:

a correspondence rule between the destination IP address of the service data flow and the data sending pipeline;

a correspondence rule between the source IP address of the service data flow and the data sending pipeline;

a correspondence rule between the destination port of the service data flow and the data sending pipeline; and a correspondence rule between the source port of the service data flow and the data sending pipeline.

Optionally, the operations performed by the processor 402 further include:

obtaining the correspondence rule between the IP description information of the to-be-sent service data flow and the data sending pipeline from a network device.

Optionally, the data sending pipeline includes a packet data network PDN connection, a bearer, or a radio access technology RAT used for sending a service data flow.

In this embodiment of the present invention, the UE obtains the service domain name information of the to-be-sent service data flow, and directly determines the corresponding data sending pipeline through matching based on the service domain name information. In this manner, the UE does not need to determine a pipeline by loading IP description information of the to-be-sent service data flow to a filter in a TFT one by one for comparing, and therefore an implementation process is relatively simple. Particularly, when there is a relatively large quantity of service server IP addresses, and the server IP addresses frequently change, there is no need to load the large quantity of server IP addresses and corresponding bearers when the method in this embodiment of the present invention is used to determine the sending pipeline of the to-be-sent service data flow. Therefore, problems that loading of the service server IP addresses fails and the data sending pipeline cannot be determined are avoided. It can be seen that according to the method in this embodiment of the present invention, the sending pipeline of the service data flow is determined in a relatively simple manner, and this is applicable to various types of data sending scenarios, thereby improving service data flow sending efficiency.

For same or similar parts in the embodiments in this specification, refer to these embodiments. Particularly, because the service data flow sending apparatus shown in FIG. 7 is basically similar to the method embodiment, the service data flow sending apparatus is briefly described. For related parts, refer to descriptions in the method embodiment.

It should further be understood that sequence numbers of the processes do not mean execution sequences in various embodiments of the present invention. The execution sequences of the processes should be determined based on functions and internal logic of the processes, and should not be construed as any limitation on the implementation processes of the embodiments of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, the units and steps in the examples described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

It may be understood that, for the brevity and clarity of the application document, technical features and descriptions in an embodiment above are applicable to other embodiments, and are no longer described in detail one by one in the other embodiments.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service data flow sending method, comprising:
receiving a to-be-sent service data flow;
obtaining service domain name information corresponding to the to-be-sent service data flow by performing a look up of a correspondence rule within a route sending rule database, wherein the route sending rule database prestores the correspondence rule between the service domain name information and a data sending channel, and wherein a format of the service domain name information includes a wildcard, and wherein the wildcard represents any one character, and wherein each correspondence that is between the service domain name information and the data sending channel that is included in the route sending rule database is marked with a valid life cycle, and wherein in response to the valid life cycle being exceeded, the corresponding correspondence between the service domain name information and the data sending channel is invalid;
determining, based on the service domain name information and in response to the to-be-sent service data flow complying with the format of the service domain name information including the wildcard, the data sending channel corresponding to the to-be-sent service data flow, wherein the data sending channel includes a packet data network (PDN) connection; and
sending, the to-be-sent service data flow via the data sending channel,
wherein obtaining the service domain name information corresponding to the to-be-sent service data flow comprises: obtaining the service domain name information based on Internet Protocol (IP) description information of the to-be-sent service data flow, and
wherein obtaining the service domain name information based on IP description information of the to-be-sent service data flow comprises:
obtaining the service domain name information based on a correspondence rule between the IP description information of the to-be-sent service data flow and the service domain name information, wherein a flow information database prestores the corresponding rule between the IP description information of the to-be-sent service data flow and the service domain name information.

2. The method according to claim 1, wherein the correspondence rule between the IP description information of the to-be-sent service data flow and the service domain name information comprises a first correspondence between the IP description information of the to-be-sent service data flow and IP description information of a service server, and a second correspondence between the IP description information of the service server and the service domain name information.

3. The method according to claim 2, wherein:
the IP description information of the to-be-sent service data flow comprises at least one of a source IP address, a destination IP address, a source port, and a destination port;
the IP description information of the service server comprises at least one of a source IP address, a destination IP address, a source port, and a destination port; and
the first correspondence comprises one or more of the following correspondences:
a correspondence between the destination IP address of the service data flow and the source IP address of the service server;
a correspondence between the destination port of the service data flow and the source port of the service server;
a correspondence between the source IP address of the service data flow and a source address range in which access of the service server is allowed; and
a correspondence between the source port of the service data flow and a source port range in which access of the service server is allowed.

4. The method according to claim 2, wherein:
the service domain name information comprises at least one of a domain name of a service, a uniform resource locator (URL) of the service, and application identifier (APP ID) information of the service; and
the second correspondence comprises one or more of the following correspondences:
a correspondence between the IP description information of the service server and the domain name of the corresponding service;
a correspondence between the IP description information of the service server and the URL of the corresponding service; and
a correspondence between the IP description information of the service server and the APP ID information of the corresponding service.

5. The method according to claim 1, wherein the method further comprises: obtaining the correspondence rule between the IP description information of the to-be-sent service data flow and the service domain name information from an application layer or an operating system of the UE.

6. The method according to claim 1, wherein obtaining the service domain name information corresponding to the to-be-sent service data flow comprises: receiving the service domain name information from an application layer or an operating system of the UE.

7. The method according to claim 1, wherein obtaining, based on the service domain name information, the data sending channel corresponding to the to-be-sent service data flow comprises: obtaining, based on a correspondence rule between the service domain name information and the data sending channel corresponding to the to-be-sent service data flow, the data sending channel corresponding to the to-be-sent service data flow.

8. The method according to claim 7, wherein the correspondence rule between the service domain name information and the data sending channel comprises one or more of the following correspondence rules:
a correspondence rule between the domain name of the service and the data sending channel;
a correspondence rule between a uniform resource locator (URL) of the service and the data sending channel; and
a correspondence rule between application identifier (APP ID) information of the service and the data sending channel.

9. A service data flow sending apparatus, comprising:
a memory configured to store program code; and
a processor configured to perform the following operations based on the program code stored in the memory:
receiving a to-be-sent service data flow;
obtaining service domain name information corresponding to the to-be-sent service data flow by performing look up of a correspondence rule within a route sending rule database, wherein the route sending rule database prestores the correspondence rule between the service domain name information and a data sending channel, and wherein a format of the service domain name information includes a wildcard, and wherein the wildcard represents any one character, and wherein each correspondence that is between the service domain name information and the data sending channel that is included in the route sending rule database is marked with a valid life cycle, and wherein in response to the valid life cycle being exceeded, the corresponding correspondence between the service domain name information and the data sending channel is invalid;

determining, based on the service domain name information and in response to the to-be-sent service data flow complying with the format of the service domain name information including the wildcard, the data sending channel corresponding to the to-be-sent service data flow, wherein the data sending channel includes a packet data network (PDN) connection; and sending the to-be-sent service data flow by using the data sending channel, wherein obtaining the service domain name information corresponding to the to-be-sent service data flow comprises:

obtaining the service domain name information based on Internet Protocol (IP) description information of the to-be-sent service data flow, and wherein obtaining the service domain name information based on IP description information of the to-be-sent service data flow comprises:

obtaining the service domain name information based on a correspondence rule between the IP description information of the to-be-sent service data flow and the service domain name information, wherein a flow information database prestores the corresponding rule between the IP description information of the to-be-sent service data flow and the service domain name information.

10. The apparatus according to claim 9, wherein the correspondence rule between the IP description information of the to-be-sent service data flow and the service domain name information comprises a first correspondence between the IP description information of the to-be-sent service data flow and IP description information of a service server, and a second correspondence between the IP description information of the service server and the service domain name information.

11. The apparatus according to claim 10, wherein:
the IP description information of the to-be-sent service data flow comprises at least one of a source IP address, a destination IP address, a source port, and a destination port;
the IP description information of the service server comprises at least one of a source IP address, a destination IP address, a source port, and a destination port; and
the first correspondence comprises one or more of the following correspondences: a correspondence between the destination IP address of the service data flow and the source IP address of the service server;
a correspondence between the destination port of the service data flow and the source port of the service server;
a correspondence between the source IP address of the service data flow and a source address range in which access of the service server is allowed; and
a correspondence between the source port of the service data flow and a source port range in which access of the service server is allowed.

12. The apparatus according to claim 10, wherein:
the service domain name information comprises at least one of a domain name of a service, a uniform resource locator (URL) of the service, and application identifier (APP ID) information of the service; and
the second correspondence comprises one or more of the following correspondences:
a correspondence between the IP description information of the service server and the domain name of the corresponding service;
a correspondence between the IP description information of the service server and the URL of the corresponding service; and
a correspondence between the IP description information of the service server and the APP ID information of the corresponding service.

13. The apparatus according to claim 9, wherein the processor is further configured to perform: obtaining the correspondence rule between the IP description information of the to-be-sent service data flow and the service domain name information from an application layer or an operating system of the apparatus.

14. The apparatus according to claim 9, wherein the processor is further configured to perform: receiving the service domain name information from an application layer or an operating system of the apparatus.

15. The apparatus according to claim 9, wherein the processor is further configured to perform: obtaining, based on a correspondence rule between the service domain name information and the data sending channel corresponding to the to-be-sent service data flow, the data sending channel corresponding to the to-be-sent service data flow.

16. The apparatus according to claim 15, wherein the correspondence rule between the service domain name information and the data sending channel comprises one or more of the following correspondence rules:
a correspondence rule between the domain name of the service and the data sending channel;
a correspondence rule between a uniform resource locator (URL) of the service and the data sending channel; and
a correspondence rule between application identifier (APP ID) information of the service and the data sending channel.

* * * * *